United States Patent
Moon et al.

(10) Patent No.: US 7,123,234 B2
(45) Date of Patent: Oct. 17, 2006

(54) LIQUID CRYSTAL DISPLAY OF LINE-ON-GLASS TYPE HAVING VOLTAGE DIFFERENCE COMPENSATING MEANS

(75) Inventors: Sung Woong Moon, Kumi-shi (KR); Young Soo Ha, Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 421 days.

(21) Appl. No.: 10/318,022

(22) Filed: Dec. 13, 2002

(65) Prior Publication Data

US 2003/0117356 A1 Jun. 26, 2003

(30) Foreign Application Priority Data

Dec. 20, 2001 (KR) .............................. P2001-81802

(51) Int. Cl.
*G09G 3/36* (2006.01)
(52) U.S. Cl. ..................... 345/98; 345/100; 349/152
(58) Field of Classification Search .......... 345/87–100, 345/103, 204–213, 101; 349/150, 49, 149, 349/152
See application file for complete search history.

(56) References Cited

U.S. PATENT DOCUMENTS 6,107,980 A * 8/2000 Hermanns et al. ............ 345/90
6,175,351 B1 * 1/2001 Matsuura et al. ............. 345/98
6,331,844 B1 * 12/2001 Okumura et al. ............. 345/87
6,509,895 B1 * 1/2003 Yanagi et al. ................ 345/211
6,590,553 B1 * 7/2003 Kimura et al. ................ 345/92
6,639,589 B1 * 10/2003 Kim et al. .................... 345/206

FOREIGN PATENT DOCUMENTS

JP          10-253942        *  9/1998

* cited by examiner

*Primary Examiner*—Richard Hjerpe
*Assistant Examiner*—Abbas I. Abdulselam
(74) *Attorney, Agent, or Firm*—McKenna Long & Aldridge LLP

(57) ABSTRACT

A LOG-type liquid crystal display device includes a picture display area having liquid crystal cells arranged at crossings of gate lines and data lines, gate driver integrated circuits for driving the gate lines are mounted on gate tape carrier packages, data driver integrated circuits for driving the data lines are mounted on data tape carrier packages, line-on-glass type signal lines arranged at an outer portion of the picture display area for applying driving signals to the gate drive integrated circuits. A voltage difference compensating means is connected to each of the gate driver integrated circuits to compensate for voltage differences between the driving signals according to line resistance differences between the line-on-glass type signal lines.

21 Claims, 8 Drawing Sheets

LIQUID CRYSTAL DISPLAY OF LINE-ON-GLASS TYPE HAVING VOLTAGE DIFFERENCE COMPENSATING MEANS

This application claims the benefit of Korean Patent Application No. 2001-81802, filed on Dec. 20, 2001, which is hereby incorporated by reference for all purposes as if fully set forth herein.

BACKGROUND OF THE INVENTION

1. Field of the Invention

The present invention relates to liquid crystal displays, and more particularly to line-on-glass (LOG)-type liquid crystal displays capable of compensating for signal voltage differences between gate driver integrated circuits due to intrinsic line resistances of LOG-type patterns on liquid crystal display panels.

2. Description of the Related Art

Generally, liquid crystal displays (LCDs) use an electric field to control light transmittance characteristics of liquid crystal material. Accordingly, LCDs typically include a liquid crystal display panel having a plurality of liquid crystal cells arranged in a matrix pattern and a driving circuit for driving the liquid crystal cells to display a picture on the liquid crystal display panel.

The liquid crystal cells are arranged on the liquid crystal display panel at locations where gate lines are found to cross data lines. Electric fields may be applied to the liquid crystal material by pixel and common electrodes arranged in the liquid crystal display panel. Each pixel electrode is connected to any one of data lines via source and drain electrodes of switching devices such as thin film transistors. Gate electrodes of each thin film transistor are connected to corresponding gate lines, thereby allowing pixel voltage signals to be applied to each of the pixel electrodes of each gate line.

The driving circuit includes a gate driver for driving the gate lines, a data driver for driving the data lines, a timing controller for controlling the gate and data drivers, and a power supply for supplying driving voltages used in driving the LCD. The timing controller controls the gate and data drivers by controlling a driving timing of the gate and data drivers and applying pixel data signals to the data driver. Driving voltages generated by the power supply include common (Vcom), gate high (Vgh), gate low (Vgl) voltages, etc. The gate driver sequentially applies scanning signals to the gate lines, thereby sequentially driving the liquid crystal cells on the liquid crystal display panel one gate line at a time. The data driver applies data voltage signals to each of the data lines whenever a gate line receives a gate signal. Accordingly, LCDs control light transmittance characteristics of liquid crystal material using electric fields applied between pixel and common electrodes in accordance with pixel voltage signals specific to a liquid crystal cell.

Data and gate drivers are directly connected to the liquid crystal display panel and are provided as a plurality of integrated circuits (ICs). Each of the gate driver ICs and data driver ICs are mounted to the liquid crystal display panel using tape carrier package (TCP) or chip on glass (COG) techniques. Further TCP-type gate and data driver ICs are connected to the liquid crystal display panel via a tape automated bonding (TAB) technique.

TCP-type gate and data driver ICs, connected to the liquid crystal display panel by the TAB technique, receive control signals and direct current (DC) voltage signals transmitted over signal lines provided on a printed circuit board (PCB). For example, data driver ICs are connected to each other in series, via signal lines mounted on a data PCB, receive control signals from the timing controller, and receive pixel data signals and driving voltages from the power supply. Gate driver ICs are connected to each other in series, via signal lines mounted on a gate PCB, receive control signals from the timing controller, and receive driving voltages from the power supply.

COG-type gate and data driver ICs are connected to each other via signal lines formed using a line-on-glass (LOG) technique. Mounted on a lower glass substrate of the liquid crystal display panel, the signal lines formed using the LOG technique receive control signals from the timing controller and power supply and driving voltages from the power supply.

Even when the various driver ICs are connected to liquid crystal display panels via the TAB technique, the LOG technique is typically adopted to eliminate the PCB and provide a thinner overall liquid crystal display. For example, signal lines connecting the gate driver ICs are relatively small and are provided directly on the liquid crystal display panel. Accordingly, gate driver ICs are connected to the liquid crystal display via the TAB technique, connected to each other in series via signal lines mounted on a lower glass substrate of the liquid crystal display panel, and receive control and driving voltage signals (i.e., gate driving signals).

Referring to FIG. 1, liquid crystal displays including LOG signal lines (e.g., formed without the gate PCB) typically include a liquid crystal display panel 1, a plurality of data TCPs 8 connected between a first side of the liquid crystal display panel 1 and a data PCB 12, a plurality of gate TCPs connected to a second side of the liquid crystal display panel 1, data driver ICs 10 mounted on the data TCPs 8, and gate driver ICs 16 mounted on the gate TCPs 14.

The liquid crystal display panel 1 includes a lower substrate 2 supporting signal lines and a thin film transistor array, an upper substrate 4 supporting a color filter array, and a layer liquid crystal material injected between the lower and upper substrates 2 and 4, respectively. The liquid crystal display panel 1 further includes a picture display area 21 having liquid crystal cells arranged where gate lines 20 and data lines 18 cross each other. The data driver ICs 10 convert digital pixel data signals into analog pixel voltage signals and apply the analog pixel voltage signals to the data lines 18.

Data pads and gate pads (not shown) are arranged at respective ends of the data and gate lines 18 and 20 at an outer portion of the lower substrate 2, outside the picture display area 21. An LOG signal line group 26 is positioned within the outer area and transmits gate driving signals to the gate driver ICs 16.

Data TCPs 8 include input pads 24 and output pads 25 for electrically connecting the data driver IC 10 mounted thereon to the data PCB 12 and the data lines 18. The input pads 24 of the data TCP 8 are electrically connected to the output pads of the data PCB 12 while the output pads 25 of the data TCP 8 are electrically connected to the data pads arranged on the lower substrate 2. A first data TCP 8 is further provided with a gate driving signal transmission group 22. The gate driving signal transmission group 22 electrically connects the LOG signal line group 26 to the timing controller and power supply via the data PCB 12.

Each of the gate TCPs 14 includes a gate driving signal transmission line group 28 and output pads 30 electrically connecting the gate driver ICs 16 mounted thereon to the LOG signal line group 26 and the gate lines 20, respectively.

Accordingly, the output pads 30 are electrically connected to the gate pads arranged on the lower substrate 2.

Each gate driver IC 16 sequentially applies a scanning signal (e.g., a gate high voltage signal (Vgh)) to each of the gate lines 20 in response to inputted control signals. Further, the gate driver ICs 16 apply a gate low voltage signal (Vgl) to each of the gate lines 20 that do not receive the gate high voltage signal (Vgh).

The LOG signal line group 26 typically consists of signal transmission lines and transmits direct current (DC) voltage signals (e.g., gate high voltage (Vgh), gate low voltage (Vgl), common voltage (Vcom), ground voltage (GND), supply voltage (Vcc) signals, etc.) and gate control signals (e.g., gate start pulse (GSP), gate shift clock (GSC), gate enable (GOE) signals, etc.).

Referring now to FIG. 2, individual signal transmission lines within the LOG signal line group 26 are arranged in a fine parallel pattern and are provided within a narrow space, similar to a space where signal lines in gate and data pads are positioned at outer portions of the picture display area 21. Signal transmission lines within the LOG signal line group 26 are formed of the same metal as the gate metal layer and are arranged on the lower substrate 2. Gate insulating and protective films 34 and 36, respectively, are disposed over the LOG signal line group 26. Being formed from the same material as the gate metal, signal transmission lines within the LOG signal line group 26 typically have a resistivity of 0.046 and are formed simultaneously with the gate lines 20. Thus, the LOG signal line group 26 has a larger resistance than signal lines, typically made of a material such as copper, formed in the gate PCB. As resistance values of signal transmission lines within the LOG signal line group 26 are proportional to their lengths, the resistance of signal transmission lines increases as the distance from the data PCB 12 increases. Accordingly, gate driving signals, transmitted via the LOG signal line group 26, become attenuated, their voltage values become distorted, and the quality of pictures capable of being displayed on the liquid crystal display becomes deteriorated.

For example, distortion of the gate low voltage signal (Vgl) transmitted through the LOG signal line group 26 affects the picture quality displayed within the picture display area 21. Gate low voltage signals (Vgl) maintain the pixel voltage charged within the liquid crystal cell between intervals when the gate high voltage (Vgh) is charged within the pixel. Accordingly, as the gate low voltage signal is distorted, the pixel voltage within the liquid crystal cell becomes distorted.

Referring still to FIG. 2, LOG gate low voltage transmission lines VGLL, arranged within the LOG signal line group 26, supply the gate low voltage (Vgl) and include first to fourth LOG gate low voltage transmission lines VGLL1 to VGLL4. The first to fourth LOG gate low voltage transmission lines VGLL1 to VGLL4 electrically connect the first data TCP 8 and first to fourth gate TCPs 14A to 14D, respectively. The first to fourth LOG-type gate low voltage transmission lines VGLL1 to VGLL4 have intrinsic line resistance values a, b, c, and d, proportional to their lengths, and are connected to each other in series via the first to fourth gate TCPs 14A to 14D.

The line resistance values a, b, c, and d alter the gate low voltages (Vgl) supplied to each gate driver IC 16. For example, the first gate driver IC 16, mounted on the first gate TCP 14A, is supplied with a first gate low voltage (VGL1). The voltage value drop of the first gate low voltage (VGL1) is proportional to the first line resistance value a of the first LOG gate low voltage transmission line (VGLL1). The first gate low voltage (VGL1) is applied to gate lines at a first horizontal line block A via the first gate driver IC 16.

The second gate driver IC 16, mounted on the second gate TCP 14B, is supplied with a second gate low voltage (VGL2). The voltage value drop of the second gate low voltage (VGL2) is proportional to the first and second line resistance values of the first and second LOG gate low voltage transmission lines (VGLL1 and VGLL2) connected to each other in series, a+b. The second gate low voltage (VGL2) is applied to gate lines at a second horizontal line block B via the second gate driver IC 16.

The third gate driver IC 16, mounted on the third gate TCP 14C, is supplied with a third gate low voltage (VGL3). The voltage value drop of the third gate low voltage (VGL3) is proportional to the first, second, and third line resistance values of the first to third LOG gate low voltage transmission lines (VGLL1 to VGLL3) connected to each other in series, a+b+c. The third gate low voltage (VGL3) is applied to gate lines at a third horizontal line block C via the third gate driver IC 16.

The fourth gate driver IC 16, mounted on the fourth gate TCP 14D, is supplied with a fourth gate low voltage (VGL4). The voltage value drop of the fourth gate low voltage (VGL4) is proportional to the first to fourth line resistance values of the first to fourth LOG gate low voltage transmission lines (VGLL1 to VGLL4) connected to each other in series, a+b+c+d. The fourth gate low voltage (VGL4) is applied to gate lines at a fourth horizontal line block D via the fourth gate driver IC 16.

As differences between the gate low voltages VGL1 to VGL4 applied to the gate lines via each gate driver IC 16 occur, the brightness to which images are displayed across the horizontal line blocks A to D becomes non-uniform. The non-uniform brightness across horizontal line blocks A to D induces a cross-line phenomenon (32) that divides the screen in brightness values and thereby deteriorates the picture quality of the liquid crystal display. Between the first gate driver IC 16 and the fourth gate driver IC 16, first to fourth line resistance values a, b, c, and d are added to each other. Accordingly, the first gate low voltage (VGL1) is greater than the second gate low voltage (VGL2), the second gate low voltage (VGL2) is greater than the third gate low voltage (VGL3), and the third gate low voltage (VGL3) is greater than the fourth gate low voltage (VGL4).

For each of the gate driver ICs 16, gate low voltage differences such as those described above can be compensated for by providing a plurality of LOG gate low voltage transmission lines independently connected to their corresponding gate driver ICs 16 and/or by enlarging the cross-sectional area of the signal transmission lines. However, these compensation solutions are difficult to satisfactorily achieve because the area in which the LOG signal line group 26 is located is not expandable and providing independently connected LOG gate low voltage transmission lines with enlarged cross-sectional areas within such small, confined spaces is difficult.

Accordingly, gate low voltage differences caused by the line resistance must be compensated for without altering the design of the LOG gate low voltage line VGLL.

SUMMARY OF THE INVENTION

Accordingly, the present invention is directed to a line-on-glass (LOG)-type liquid crystal display that substantially obviates one or more of the problems due to limitations and disadvantages of the related art.

An advantage of the present invention provides a LOG liquid crystal display wherein voltage differences between gate driver ICs, caused by a variance in line resistances of signal transmission lines within a LOG signal line group, is compensated for and a uniform brightness may be expressed across horizontal line blocks on the liquid crystal display.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a line-on-glass liquid crystal display device includes a picture display area having liquid crystal cells arranged where gate lines and data lines cross each other; gate driver integrated circuits, for driving the gate lines, mounted on gate tape carrier packages; data driver integrated circuits, for driving the data lines, mounted on data tape carrier packages; line-on-glass (LOG) signal lines arranged at an outer portion of the picture display area via a line-on-glass technique for applying driving signals to the gate driver integrated circuits; and a voltage difference compensating means, connected to the gate drive integrated circuits, for compensating for a voltage difference between the driving signals according to a line resistance difference between the LOG signal lines connected to each gate drive integrated circuit.

In one aspect of the present invention, the voltage difference compensating means may include gate low voltage difference compensating means for compensating for a gate low voltage difference due to a difference in line resistance between gate low voltage transmission lines, wherein the gate low voltage transmission lines include LOG signal lines.

In another aspect of the present invention, the gate low voltage difference compensating means may include a resistor arranged at a gate low voltage input terminal of a gate drive integrated circuit, wherein a resistance value of the resistor corresponds to each integrated circuit.

In yet another aspect of the present invention, the gate low voltage difference compensating means may include a resistor arranged at an output terminal of the gate drive integrated circuit, wherein a resistance value of the resistor corresponds to each integrated circuit.

In one aspect of the present invention, the resistor may be arranged at any of the input and output terminals of the gate driver integrated circuit and have a resistance value inversely proportional to a line resistance value of the LOG gate low voltage transmission line connected to the gate driver integrated circuit.

In still another aspect of the present invention, the gate low voltage difference compensating means may include a Zener diode arranged at a gate low voltage input terminal of the gate driver integrated circuit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
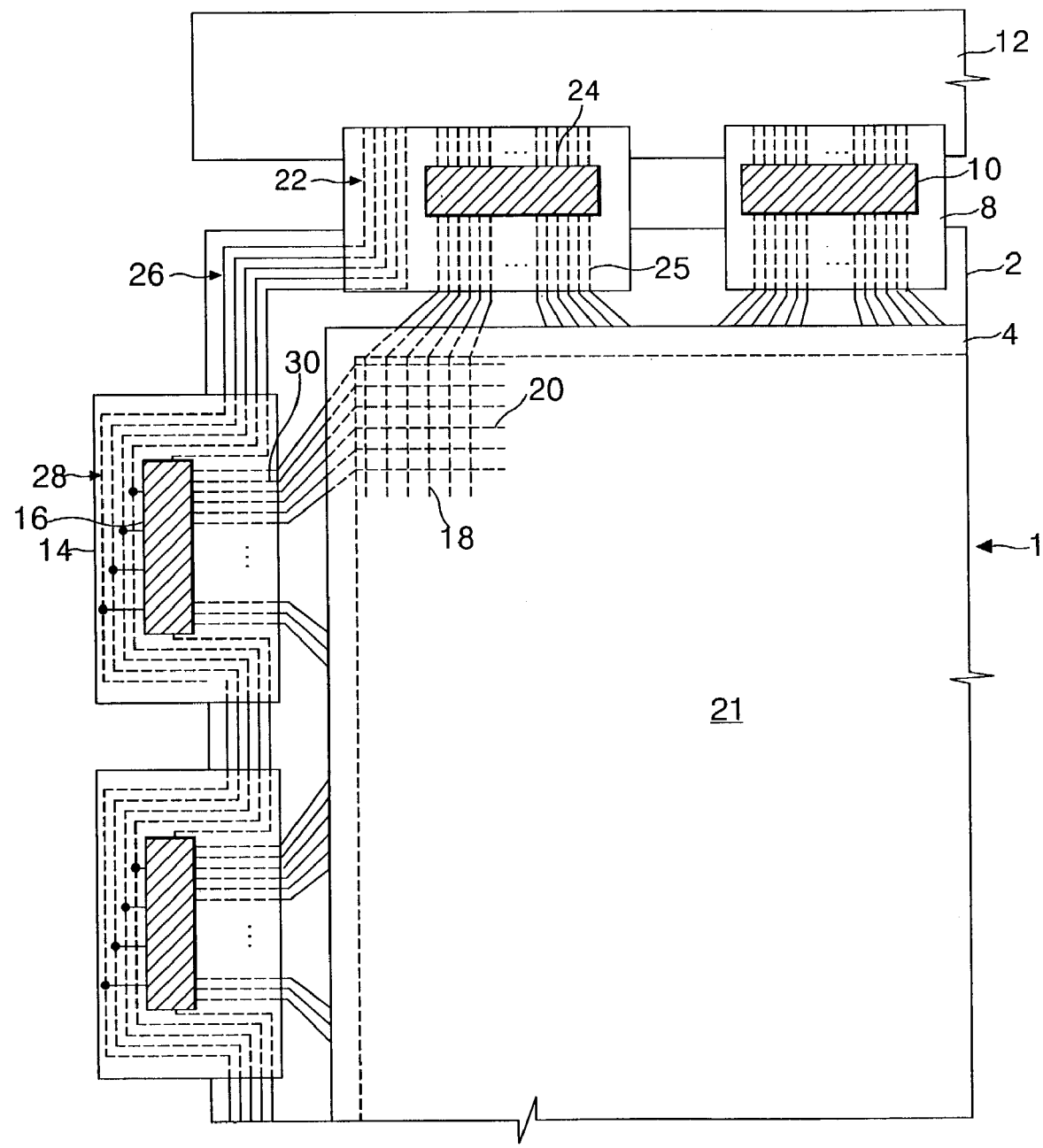
FIG. 1 illustrates a schematic plan view of a line-on-glass type liquid crystal display according to the related art.
Figure 2:
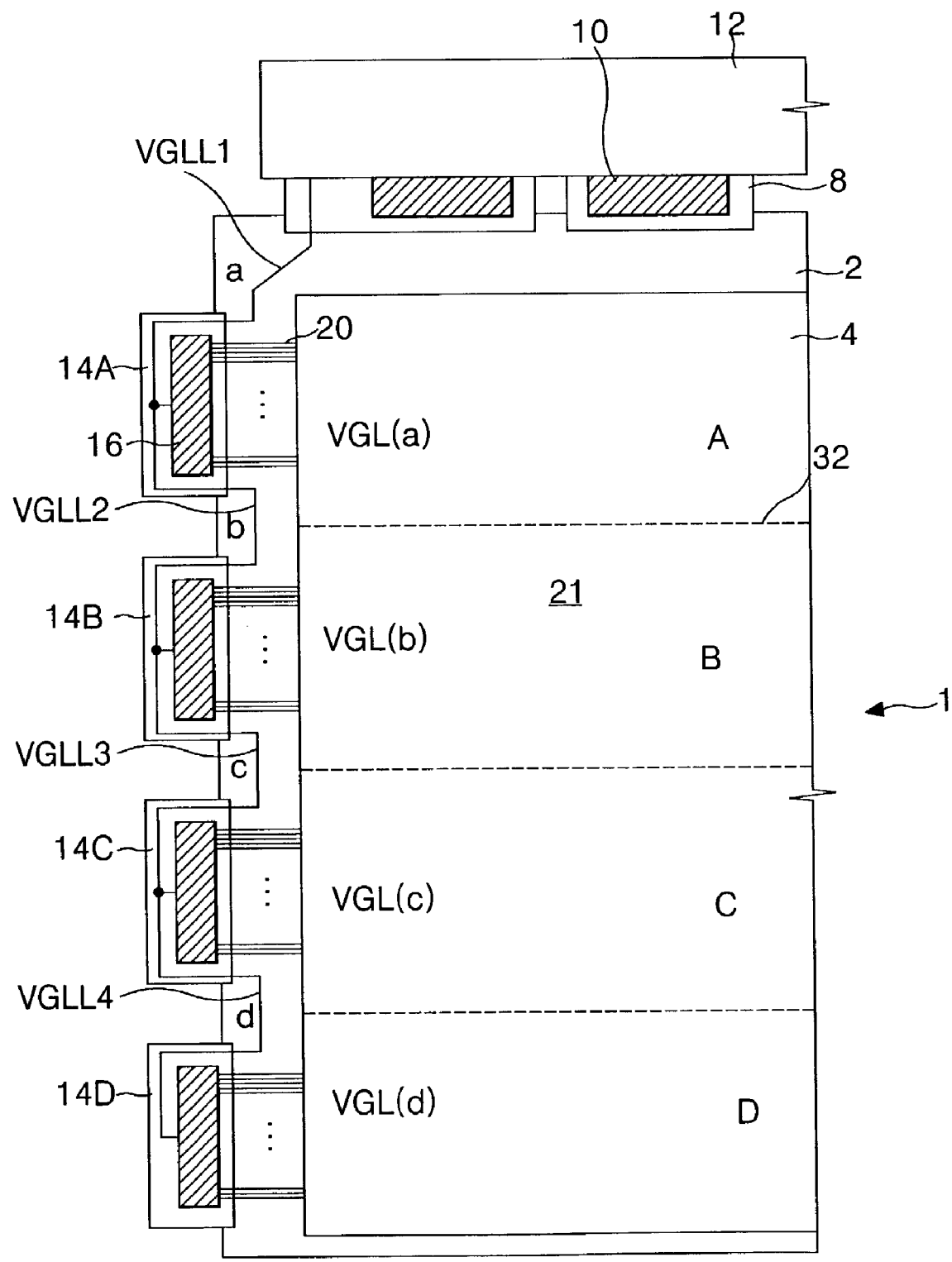
FIG. 2 illustrates a schematic view of a cross-line phenomenon between horizontal line blocks caused by differences in line resistances within the line-on-glass signal line group shown in FIG. 1.
Figure 3:
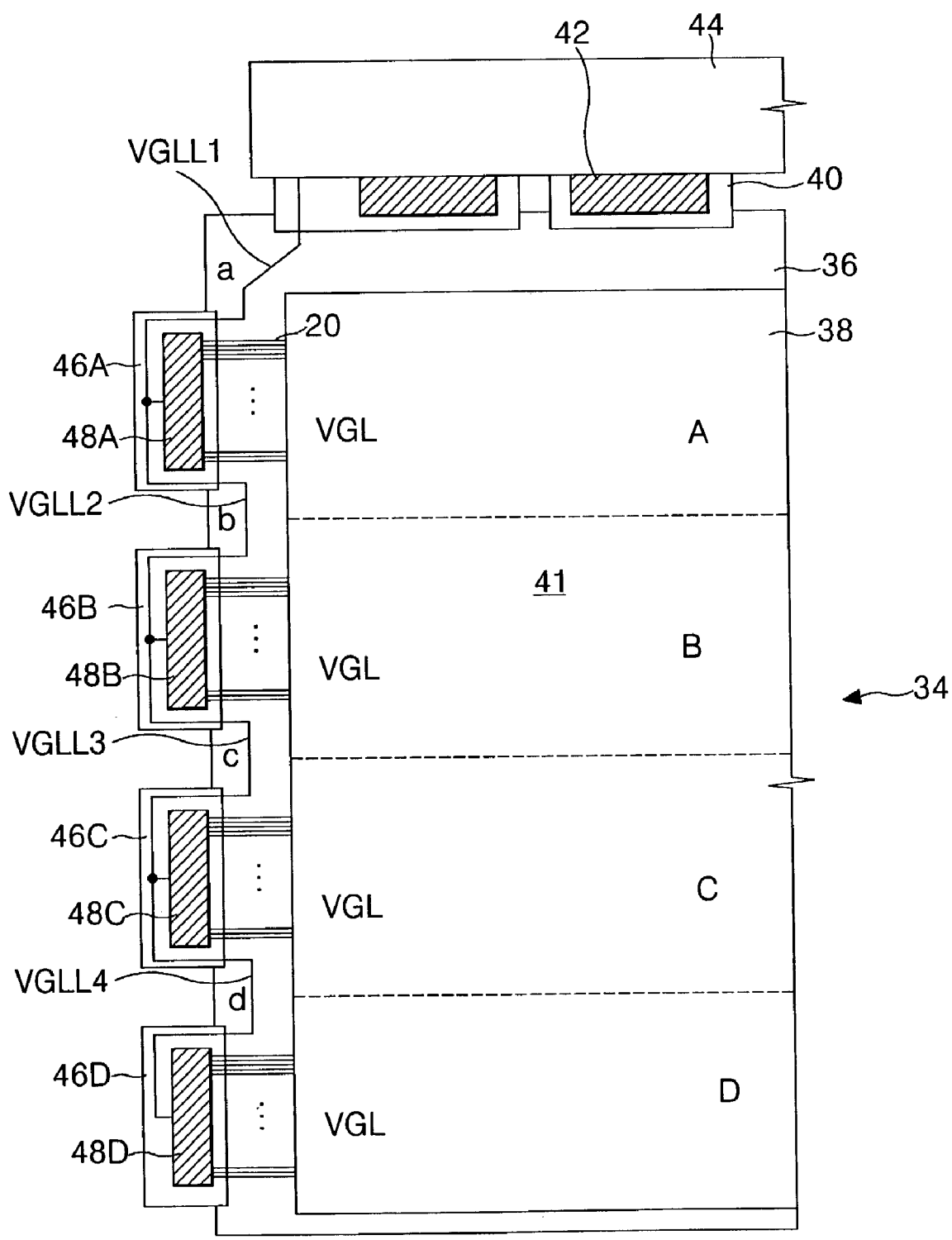
FIG. 3 illustrates a schematic view of a line-on-glass liquid crystal display according to one aspect of the present invention.

FIG. 3 illustrates a schematic view of a line-on-glass liquid crystal display according to one aspect of the present invention.

Referring to FIG. 3, the liquid crystal display according to the principles of the present invention may, for example, include a liquid crystal display panel 34, a plurality of data TCPs 40 connected between a first side of the liquid crystal display panel 34 and a data PCB 44, first to fourth gate TCPs 46A to 46D connected to a second side of the liquid crystal display panel 34, a plurality of data driver ICs 42 mounted on the data TCPs 40, and first to fourth gate driver ICs 48A to 48D mounted on the first to fourth gate TCPs 46A to 46D, respectively. In one aspect of the present invention, an input terminal of each of the gate driver ICs 48A to 48D may be provided with a compensating means for compensating for a line resistance difference in an amount proportional to a line length of a LOG gate low voltage transmission line VGLL, as will be discussed in greater detail below. The data driver ICs 42 convert digital pixel data signals into analog pixel voltage signals and apply the analog pixel voltage signals to data lines on the liquid crystal display panel.

The liquid crystal display panel 34 may, for example, include a lower substrate 36 supporting signal lines and a thin film transistor array, an upper substrate 38 supporting a color filter array, and a layer of liquid crystal material injected between the lower and upper substrates 36 and 38, respectively. The liquid crystal display panel 34 may further include a picture display area 41 having a plurality of liquid crystal cells arranged where the gate lines 52 cross a plurality of data lines (not shown). Data pads and gate pads may be arranged at respective ends of the data and gate lines at an outer portion of the lower substrate 36, outside the picture display area 41. First to fourth LOG gate low voltage transmission lines VGLL1 to VGLL4, for transmitting gate driving signals applied to the gate driver ICs 48A to 48D, may be arranged within the outer portion of the lower substrate 36.

A first data TCP 40 may, for example, include input and output pads for electrically connecting the data driver IC 42 mounted thereon to the data PCB 44. The input pads of the first data TCP 40 are electrically connected to the output pads of the data PCB 44 while the output pads of the first data TCP 40 electrically connect the data driver IC 42 to data pads of the lower substrate 36. In one aspect of the present invention, the first data TCP 40 may further include a gate driving signal transmission line group (not shown) for electrically connecting the first LOG gate low voltage transmission line VGLL1 on the lower substrate 36 to the timing controller and power supply via the data PCB 44.

Mounted with the first to fourth gate driver ICs 48A to 48D, the first to fourth gate TCPs 46A to 46D may be connected to gate pads of the lower substrate 36 via output pads of the gate driving IC 48. The first to fourth gate TCPs 46A to 46D may further include a gate driving signal transmission line group connecting the first to fourth LOG gate low voltage transmission lines VGLL1 to VGLL4 and first to fourth gate driver ICs 48A to 48D on the lower substrate 36.

Each of the first to fourth gate driver ICs 48A to 48D may sequentially apply a scanning signal (e.g., a gate high voltage signal (Vgh)) to each of the gate lines in response to inputted control signals. Further, each of the first to fourth gate driver ICs 48A to 48D may apply a gate low voltage signal (Vgl) to each of the gate lines when the gate high voltage signal (Vgh) is not applied.

The first to fourth LOG gate low voltage transmission lines VGLL1 to VGLL4 may transmit direct current voltage signals (e.g., gate high voltage (Vgh), gate low voltage (Vgl), common voltage (Vcom), ground voltage (GND), supply voltage (VCC) signals, etc.) generated by a power supply (not shown) and also transmit gate control signals (e.g., gate start pulse (GSP), gate shift clock (GSC), gate enable (GOE) signals, etc.) generated by a timing controller (not shown). First to fourth LOG gate low voltage transmission lines VGLL1 to VGLL4 may be formed from the same material as the gate lines 52 (e.g., metal). The first to fourth LOG gate low voltage transmission lines VGLL1 to VGLL4 have intrinsic line resistance values proportional to their lengths.

In order to compensate for voltage differences in gate driving signals applied to each gate driver ICs 48A to 48D generated by an intrinsic line resistance within the first to fourth LOG gate low voltage transmission lines VGLL1 to VGLL4, a compensating resistor may be included within each of the gate driver ICs 48A to 48D. For example, the compensating resistor may be provided at the gate low voltage input terminals of each of the first to fourth gate driver ICs 48A to 48D, thereby improving the quality of pictures displayed within the picture display area 41.

In one aspect of the present invention, the first to fourth LOG gate low voltage transmission lines VGLL1 to VGLL4 may connect the first data TCP 40 to the first to fourth gate TCPs 46A to 46D. The first to fourth LOG-type gate low voltage transmission lines VGLL1 to VGLL4 have first to fourth line resistance values, a, b, c, and d, proportional to their individual lengths and may be connected to each other in series via the first to fourth gate TCPs 46A to 46D. In order to prevent a gate low voltage signal (Vgl), applied to the first to fourth gate driver ICs 48A to 48D, from becoming differentiated due to the first to fourth line resistance values of the LOG gate low voltage transmission lines VGLL1 to VGLL4, a, b, c and d, different compensating resistors may be provided at the gate low voltage input terminals of each of the first to fourth gate driver ICs 48A to 48D, in shown in FIGS. 4A to 4D. Accordingly, line resistance values of the first to fourth LOG gate low voltage transmission lines VGLL1 to VGLL4 may be individually determined for each of the first to fourth gate driver ICs 48A to 48D and compensating resistance values for each of the compensating resistors may be provided using the largest line resistance value (e.g., the cumulative line resistance value a+b+c+d of the first to fourth LOG-type gate low voltage transmission lines VGLL1 to VGLL4) present at the fourth gate driver IC 48D. Accordingly, referring back to FIG. 3, a compensating resistance value for the compensating resistors may be provided such that line resistance values at each of the first to fourth gate driver ICs 48A to 48D are substantially equal.

Figure 4A:
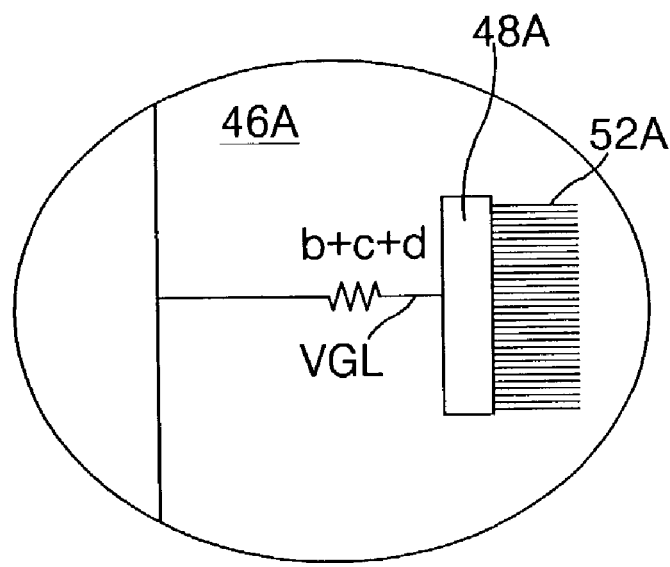
FIGS. 4A to 4D illustrate enlarged views of gate driver ICs shown in FIG. 3 according to one aspect of the present invention;.

Referring to FIG. 4A, a first compensating resistor having, for example, a resistance value substantially equal to the cumulative second to fourth line resistance values, b+c+d, may be arranged on the first LOG gate low voltage transmission line VGLL1 at the input terminal of the first gate driver IC 48A. Thus, a gate low voltage signal (Vgl), reduced by a predetermined amount proportional to a resistance value substantially equal to a sum of the first line resistance, a, and the resistance value of the first compensating resistor, may be applied to the first gate driver IC 48A. Accordingly, a voltage corresponding to the gate low voltage signal (Vgl) may be applied to the gate lines within the first horizontal line block A via a first output pad 52A of the first gate driver IC 48A.

Figure 4B:
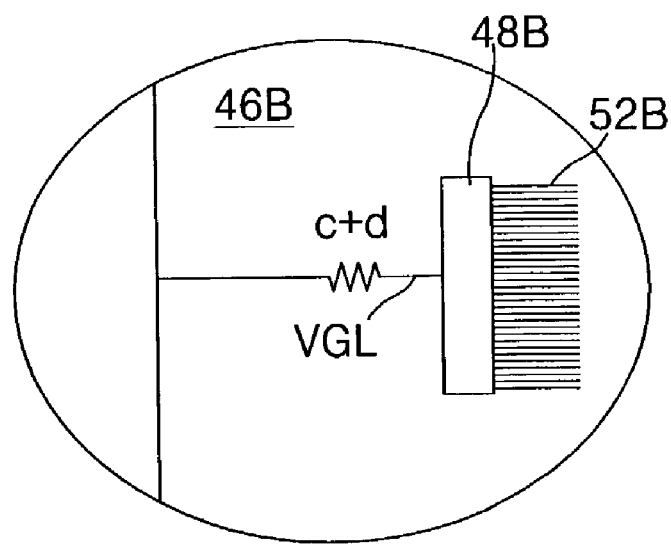

Referring to FIG. 4B, a second compensating resistor having, for example, a resistance value substantially equal to the cumulative third and fourth line resistance values, c+d, may be arranged on the second LOG gate low voltage transmission line VGLL2 at the input terminal of the second gate driver IC 48B. Thus, a gate low voltage signal (Vgl), reduced by a predetermined amount proportional to a resistance value substantially equal to a sum of the first and second line resistances, a+b, and the resistance value of the second compensating resistor, may be applied to the second gate driver IC 48B. Accordingly, a voltage corresponding to the gate low voltage signal (Vgl) may be applied to the gate lines within the second horizontal line block B via a second output pad 52B of the second gate driver IC 48B.

Figure 4C:
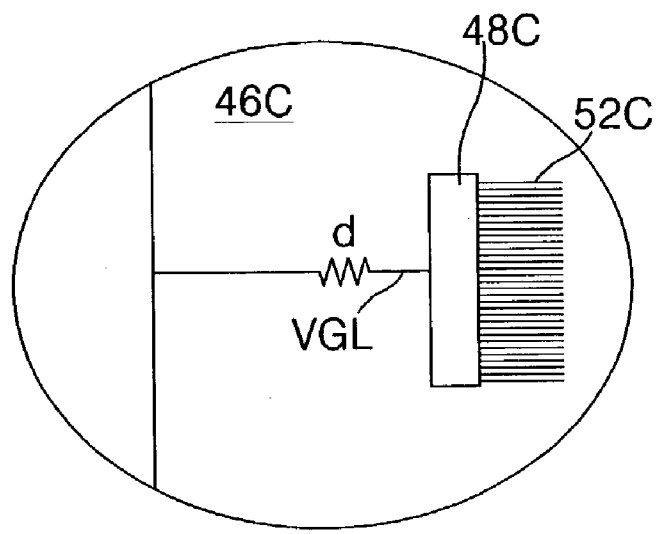

Referring to FIG. 4C, a third compensating resistor having, for example, a resistance value substantially equal to the fourth line resistance value, d, may be arranged on the third LOG gate low voltage transmission line VGLL3 at the input terminal of the third gate driver IC 48C. Thus, a gate low voltage signal (Vgl), reduced by a predetermined amount proportional to a resistance value substantially equal to a sum of the first, second, and third line resistances, a+b+c, and the resistance value of the third compensating resistor, may be applied to the third gate driver IC 48C. Accordingly, a voltage corresponding to the gate low voltage signal (Vgl) may be applied to the gate lines within the gate lines at the third horizontal line block C via a third output pad 52C of the third gate driver IC 48C.

Figure 4D:
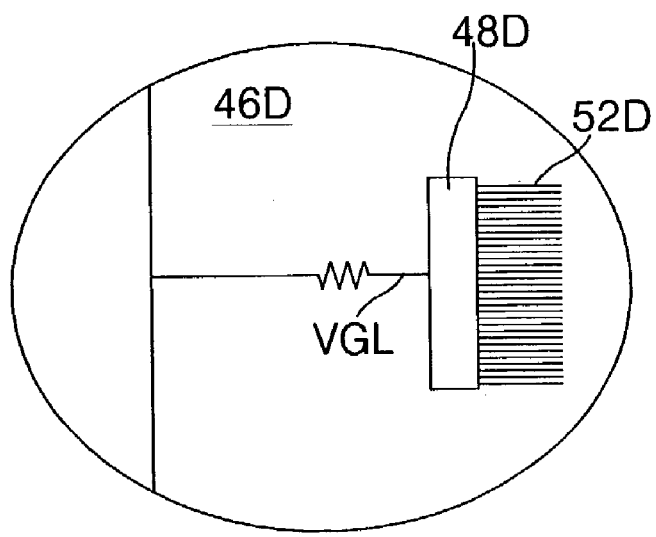

Referring to FIG. 4D, a fourth compensating resistor having, for example, a substantially negligible resistance value, may be arranged on the fourth LOG gate low voltage transmission line VGLL4 at the input terminal of the fourth gate driver IC 48D. In one aspect of the present invention, no resistor may be arranged at the input terminal of the fourth gate driver IC 48D. Thus, a gate low voltage signal (Vgl), reduced by a predetermined amount proportional to a resistance value substantially equal to a sum of the first, second, third, and fourth line resistances, a+b+c+d, may be applied to the fourth gate driver IC 48D. Accordingly, a voltage corresponding to the gate low voltage signal (Vgl)

may be applied to the gate lines within the fourth horizontal block D via a fourth output pad 52D of the fourth gate driver IC 48D.

As described above, first to fourth compensating resistors may be arranged at input terminals of each of the first to fourth gate driver ICs 48A to 48D, respectively, to compensate for differences in line resistance that are proportional to lengths of LOG gate low voltage transmission lines. Accordingly, resistance values at each of the input terminals of the first to fourth gate driver ICs 48A to 48D may be substantially equalized so that substantially identical voltages corresponding to the gate low voltage signal (Vgl) may be applied to the gate lines via the first to fourth gate driver ICs 48A to 48D and liquid crystal cells across horizontal blocks A to D may express images at a substantially uniform brightness.

In an alternative aspect of the present invention, and referring to FIGS. 5A to 5D, different compensating resistors may be provided at the output terminals of the first to fourth gate driver ICs 54A to 54D, thereby enabling liquid crystal cells across horizontal blocks A to D to express images at a substantially uniform brightness.

Figure 5A:
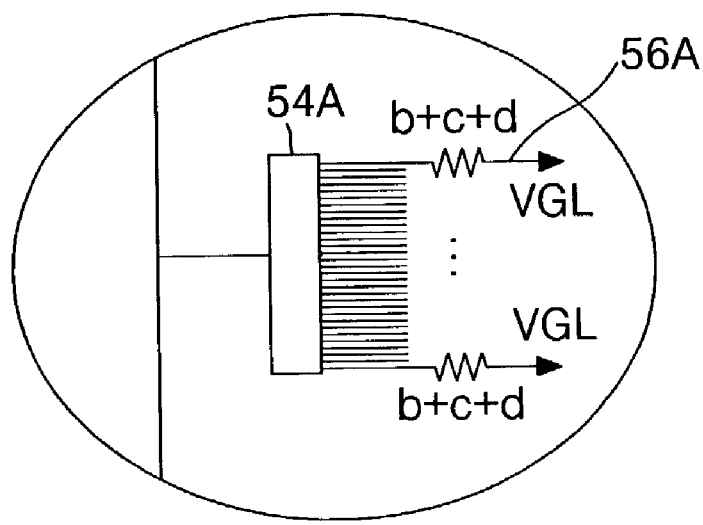
FIGS. 5A to 5D illustrate enlarged views of gate driver ICs shown in FIG. 3 according to another aspect of the present invention.

For example, referring to FIG. 5A, a plurality of first compensating resistors each having, for example, a resistance value substantially equal to the cumulative second to fourth line resistance values, b+c+d, may be arranged on the first LOG gate low voltage transmission line VGLL1 at a first plurality of output lines 56A of the gate driver IC 54A. Thus, a gate low voltage signal (Vgl), reduced by a predetermined amount proportional to a resistance value substantially equal to a sum of the first line resistance, a, and the resistance values of the first compensating resistors, may be applied to the gate lines within the first horizontal block A via the first gate driver IC 54A. Accordingly, a voltage corresponding to the gate low voltage signal (Vgl) may be applied to the gate lines within the first horizontal block A via a first plurality of output lines 56A connected to the first gate driver IC 54A.

Figure 5B:
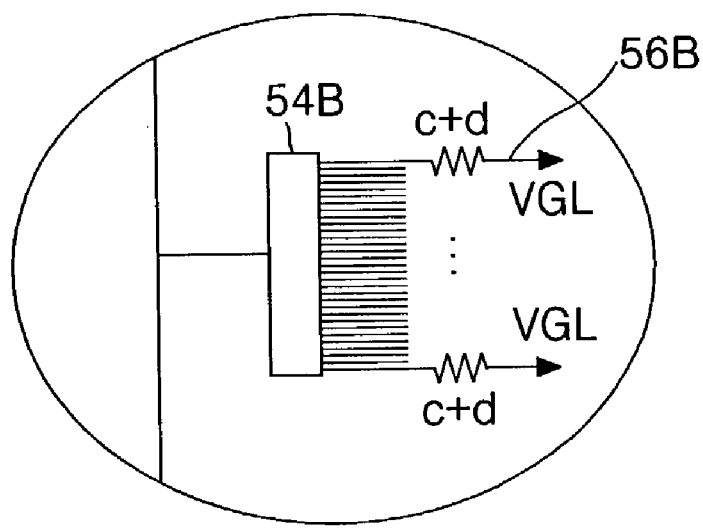

Referring to FIG. 5B, a plurality of second compensating resistors each having, for example, a resistance value substantially equal to the cumulative third and fourth line resistance values, c+d, may be arranged on the second LOG gate low voltage transmission line VGLL2 at a second plurality of output lines 56B of the second gate driver IC 54B. Thus, a gate low voltage signal (Vgl), reduced by a predetermined amount proportional to a resistance value substantially equal to a sum of the first and second line resistances, a+b, and the resistance values of the second compensating resistors, may be applied to the gate lines within the second horizontal line block B via the second gate driver IC 54B. Accordingly, a voltage corresponding to the gate low voltage signal (Vgl) may be applied to the gate lines within the second horizontal block B via a second plurality of output lines 56B connected to the second gate driver IC 54B.

Figure 5C:
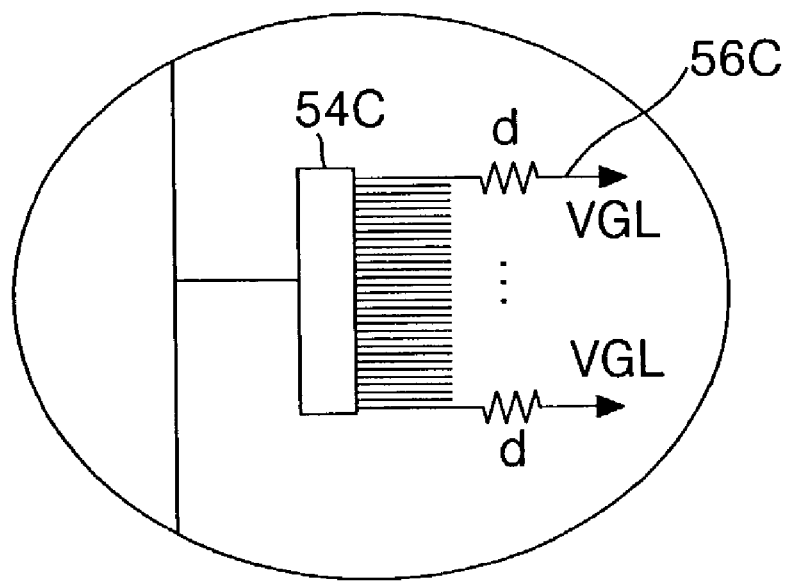

Referring to FIG. 5C, a plurality of third compensating resistors each having, for example, a resistance value substantially equal to the fourth-line resistance value, d, may be arranged on the third LOG gate low voltage transmission line VGLL3 at a third plurality of output lines 56C of the third gate driver IC 54C. Thus, a gate low voltage signal (Vgl), reduced by a predetermined amount proportional to a resistance value substantially equal to a sum of the first to third line resistances, a+b+c, and the resistance values of the third compensating resistors, may be applied to the gate lines within the third horizontal line block C via the third gate driver IC 54C. Accordingly, a voltage corresponding to the gate low voltage signal (Vgl) may be applied to the gate lines within the third horizontal block C via a third plurality of output lines 56C connected to the third gate driver IC 54C.

Figure 5D:
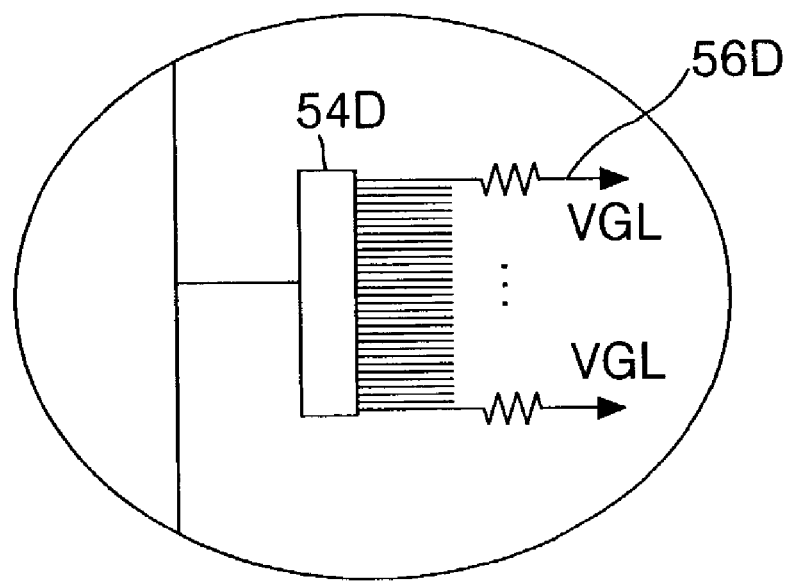

Referring to FIG. 5D, a plurality of fourth compensating resistors having, for example, a substantially negligible resistance value, may be arranged on the fourth LOG gate low voltage transmission line VGLL4 at a fourth plurality of output lines 56D of the fourth gate driver IC 54D. In one aspect of the present invention, no resistor may be arranged at the input terminal of the fourth gate driver IC 48D. Thus, a gate low voltage signal (Vgl), reduced by a predetermined amount proportional to a resistance value substantially equal to a sum of the first to fourth line resistances, a+b+c+d, may be applied to the gate lines at the fourth horizontal line block D via the fourth gate driver IC 54D. Accordingly, a voltage corresponding to the gate low voltage signal (Vgl) may be applied to the gate lines within the fourth horizontal block D via a fourth plurality of output lines 56D connected to the fourth gate driver IC 54D.

As mentioned above, pluralities of first to fourth compensating resistors may be arranged at output terminals of each of the first to fourth gate driver ICs 54A to 54D, respectively, to compensate for differences in line resistance that are proportional to lengths of LOG gate low voltage transmission lines. Accordingly, substantially identical voltages corresponding to the gate low voltage signal (Vgl) may be applied to the, gate lines via the first to fourth gate driver ICs 54A to 54D and liquid crystal cells across horizontal blocks A to D may express images at a substantially uniform brightness.

Figure 6:
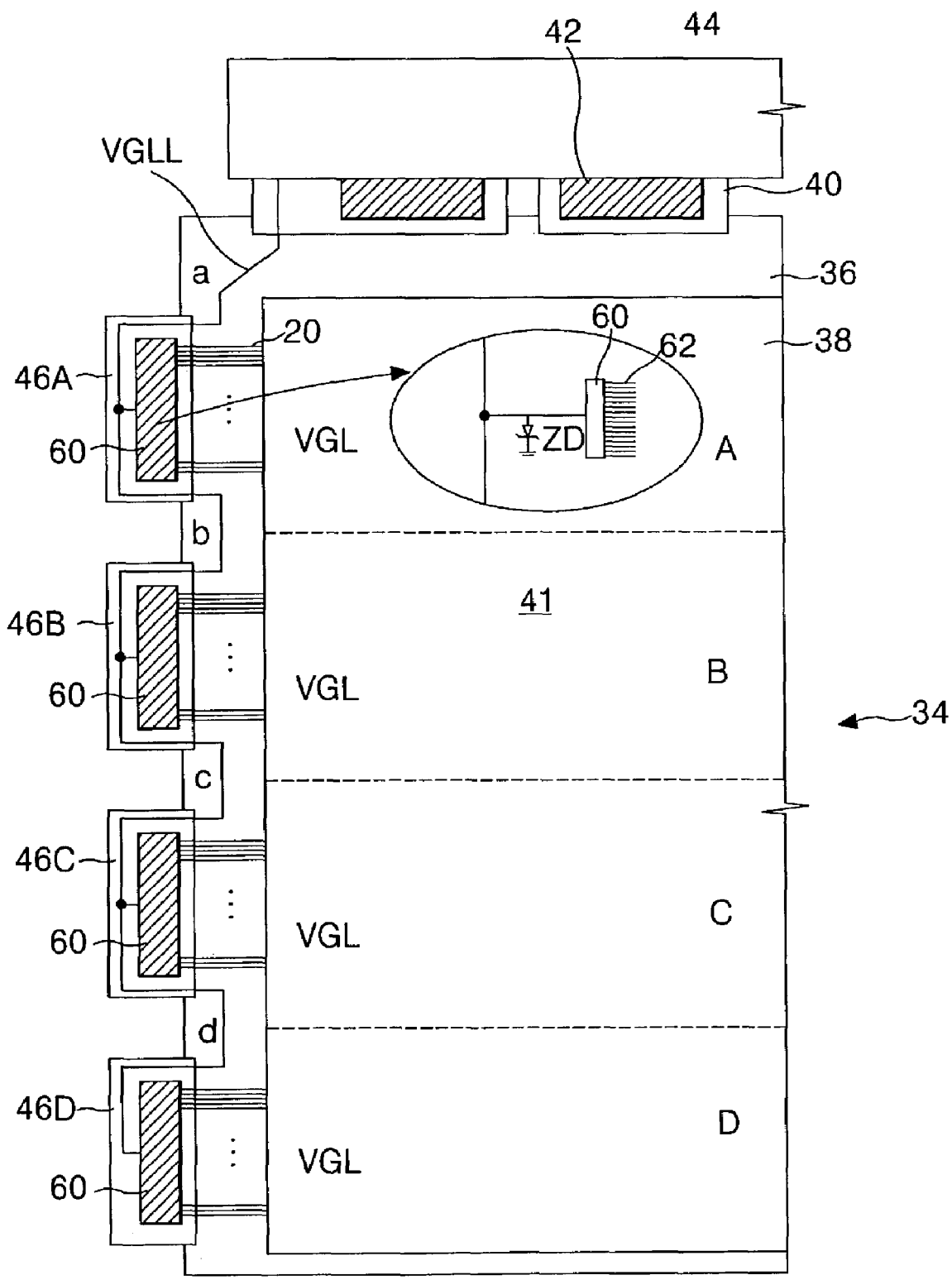
FIG. 6 illustrates a schematic view of a line-on-glass type liquid crystal display according to still another aspect of the present invention.

Referring to FIG. 6, in another aspect of the present invention, Zener diodes ZD may be provided at gate low voltage input terminals of each of the first to fourth gate driver ICs 60. Accordingly, a constant gate low voltage signal (Vgl) may be provided to each of the gate lines 20. According to the principles of the present invention, the Zener diode ZD maintains a constant voltage at input terminals of the gate driver IC 60 and allows a constant gate low voltage to be inputted to each gate driver IC 60 independently of a line resistance differences within the LOG gate low voltage transmission lines. Accordingly, substantially identical voltages corresponding to the gate low voltage signal (Vgl) may be applied to the gate lines via the first to fourth gate driver ICs 60 and liquid crystal cells across horizontal blocks A to D may express images at a substantially uniform brightness.

In accordance with the principles of the present invention, different compensating resistors, provided for each gate driver IC, may be arranged at input or output terminals of each gate driver IC for the purpose of compensating for a line resistance difference of LOG gate low voltage transmission lines such that substantially identical gate low voltage signals may be applied to each of the gate lines within a liquid crystal display. Furthermore, a Zener diode may be provided at input terminals of gate driver ICs and maintain a constant voltage, thereby applying a constant gate low voltage to gate lines independently of line resistance differences of the LOG-type gate low voltage transmission line, via each gate driver IC. Accordingly, substantially identical voltages corresponding to the gate low voltage signal (Vgl) may be applied to the gate lines of horizontal blocks via a plurality of gate driver ICs and liquid crystal cells across horizontal blocks may express images at a substantially uniform brightness.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A line-on-glass liquid crystal display device, comprising:
   a picture display area having a plurality of liquid crystal cells arranged at crossings of gate lines and data lines;
   a plurality of gate driver integrated circuits for driving the gate lines mounted on a plurality of gate tape carrier packages;
   a plurality of data driver integrated circuits for driving the data lines mounted on a plurality of data tape carrier packages;
   a plurality of line-on-glass signal lines arranged at an outer portion of the picture display area for applying driving signals capable of driving gate driver integrated circuits; and
   voltage difference compensating means coupled to the plurality of gate driver integrated circuits for compensating for voltage differences between the applied driving signals according to differences in line resistance between the plurality of line-on-glass signal lines connected to each of the plurality of gate driver integrated circuits.

2. The line-on-glass liquid crystal display device according to claim 1, wherein the voltage difference compensating means comprises a plurality of gate low voltage difference compensating means for compensating for gate low voltage differences caused by differences in line resistance between gate low voltage transmission lines capable of transmitting a gate low voltage.

3. The line-on-glass liquid crystal display device according to claim 2, wherein the gate low voltage difference compensating means comprises a resistor provided at gate low voltage input terminals of the plurality of gate driver integrated circuits, wherein a resistance value of the resistor is unique to each of the plurality of gate driver integrated circuits.

4. The line-on-glass type liquid crystal display device according to claim 2, wherein the gate low voltage difference compensating means comprises a resistor provided at output terminals of the plurality of gate driver integrated circuits, wherein a resistance value of the resistor is unique to each of the plurality of gate driver integrated circuits.

5. The line-on-glass type liquid crystal display device according to claim 2, wherein the gate low voltage difference compensating means comprises a resistor having a resistance value of the resistor that is inversely proportional to a line resistance value of the line-on-glass gate low voltage transmission line connected to the gate driver integrated circuit.

6. The line-on-glass liquid crystal display device according to claim 2, wherein the gate low voltage difference compensating means comprises a Zener diode provided at a gate low voltage input terminal of each of the plurality of gate driver integrated circuits.

7. The line-on-glass liquid crystal display according to claim 1, further comprising a liquid crystal display panel having a substrate, wherein the picture display area is included within the liquid crystal display panel and wherein the plurality of line-on-glass signal lines are arranged on the substrate.

8. A liquid crystal display, comprising:
   a plurality gate lines;
   a plurality of gate driver integrated circuits each connected to a plurality of the gate lines; and
   a plurality of signal transmission lines connected to each other in series via the plurality of gate driver integrated circuits; compensating means coupled to each of the plurality of gate driver integrated circuits for compensating for differences in line resistance within the plurality of signal transmission lines such that a voltage may be uniformly applied to each of the plurality of gate lines.

9. The liquid crystal display according to claim 8, wherein the compensating means comprises at least one compensating resistor having a resistance value corresponding to a location of each of the plurality of gate driver integrated circuits on the plurality of signal transmission lines.

10. The liquid crystal display according to claim 9, wherein the at least one compensating resistor is coupled between the plurality of gate driver integrated circuits and the plurality of signal transmission lines.

11. The liquid crystal display according to claim 9, wherein the at least one compensating resistor is coupled between the plurality of gate lines and the plurality of gate driver integrated circuits.

12. The liquid crystal display according to claim 8, wherein the compensating means comprises a diode provided between the plurality of gate driver integrated circuits and the plurality of signal transmission lines.

13. The liquid crystal display according to claim 12, wherein the diode comprises a Zener diode.

14. The liquid crystal display according to claim 8, wherein the plurality of signal transmission lines comprise line-on-glass signal transmission lines.

15. The liquid crystal display according to claim 8, wherein the voltage comprises a gate low voltage.

16. A liquid crystal display, comprising:
   a liquid crystal display panel;
   a plurality of gate lines arranged within the liquid crystal display panel, the predetermined ones of the plurality of gate lines being arranged within a plurality of consecutive blocks;
   a plurality of driver circuits coupled each other in series, each of the plurality of driver circuits being coupled to the plurality of gate lines arranged within a corresponding one of the plurality of horizontal blocks; and
   a plurality of compensating means coupled to each of the plurality of driver circuits for compensating a difference in a voltage applied to input terminals of each of the plurality of driver circuits such that the voltage may be uniformly applied to each of the plurality of gate lines.

17. The liquid crystal display according to claim 16, wherein resistance values of succeeding ones of the plurality of compensating means incrementally increases by a predetermined amount.

18. The liquid crystal display according to claim 16, further comprising a plurality of line-on-glass signal transmission lines coupling the plurality of driver circuits to each other.

19. The liquid crystal display according to claim 16, wherein the plurality of compensating means comprises at least one compensating resistor coupled to input terminals of the plurality of driver circuits.

20. The liquid crystal display according to claim 16, wherein the plurality of compensating means comprises at least one compensating resistor coupled to output terminals of the plurality of driver circuits.

21. The liquid crystal display according to claim 16, wherein the plurality of compensating means comprises a Zener diode coupled to input terminals of the plurality of driver circuits.

* * * * *